Nov. 26, 1935.                H. A. DEPEW                2,021,990
            PROCESS OF TREATING ZINC SULPHIDE OR ZINC OXIDE PIGMENT
                            Filed June 19, 1933
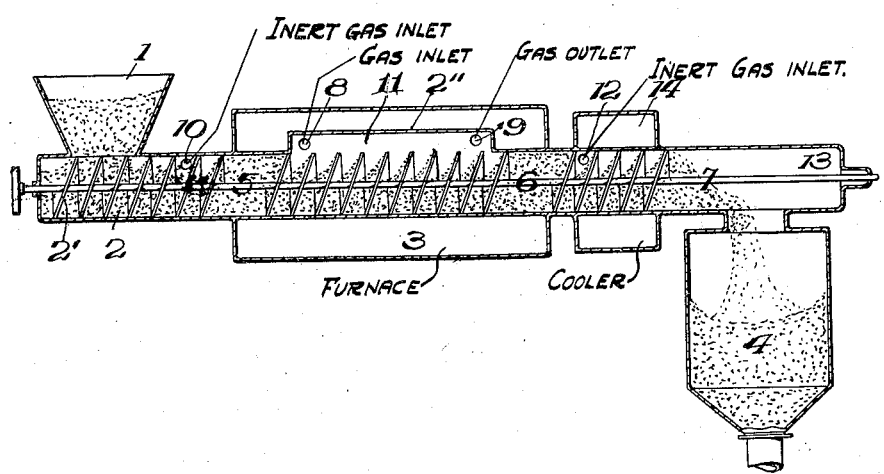
Inventor
Harlan A. Depew
By
Cameron, Kerkam + Sutton  Attorneys Patented Nov. 26, 1935

2,021,990

UNITED STATES PATENT OFFICE 2,021,990

PROCESS OF TREATING ZINC SULPHIDE OR ZINC OXIDE PIGMENT

Harlan A. Depew, Columbus, Ohio, assignor to American Zinc, Lead & Smelting Company, St. Louis, Mo., a corporation of Maine Application June 19, 1933, Serial No. 676,590

7 Claims. (Cl. 134—78)

This invention relates to the treatment of zinc sulphide or zinc oxide pigments for the purpose of removing impurities therefrom.

When zinc sulphide is made by the reaction of zinc vapor and sulphur vapor, the product may contain in addition to the zinc sulphide some free sulphur, some zinc and zinc oxide and even some carbon, as well as some absorbed tars and gases. These additional substances are impurities in the zinc sulphide and the amount and character of these impurities will depend on the details of the procedure followed in making the zinc sulphide. Zinc oxide made by the American process contains either $SO_3$ as a gas on the surface of the zinc oxide particles or combined with them as zinc sulphate. For some purposes this acidic material ($SO_3$ or $ZnSO_4$) is undesirable or too great in amount and hence it becomes desirable to eliminate all or a part of it.

The object of the present invention is to remove such of the above mentioned impurities as may exist in these pigments.

In the ordinary manufacture of lithopone and zinc sulphide, the product is secured in the form of a damp cake, which cake is fed into a muffle and the atmosphere of steam generated in the muffle protects the zinc sulphide from oxidation. At the completion of the muffle procedure, the reactive pigment is plunged into water to cool it without oxidation.

By another process the zinc sulphide is made dry, that is, made without subjecting it to the action of moisture, and it is desirable to keep it dry throughout the method of manufacture and this is one of the objects of the present invention.

By the method of the present invention, the zinc sulphide, with its contained impurities to be treated, is heated in a chamber at the desired temperature (400° C.–900° C. depending on individual considerations) in an atmosphere of steam such as is common practice in the muffling of these products, and the present invention provides a method whereby refinement of the zinc sulphide may be secured without subjecting the zinc sulphide to the action of moisture; whereby the impurities may be carried off or removed from the muffling chamber by an atmosphere of steam or other inert gas. Preferably and as here shown, the process is a continuous one and the apparatus employed effects a continuous passage of the zinc sulphide through the muffling furnace and thence through a dry cooler i. e. one that does not subject the sulphide to the action of moisture and on to a suitable container. The steam in the muffle is at a high temperature and slight pressure and means are provided for preventing the steam under pressure from coming in contact with the pigment before it enters the muffle and after it passes therefrom into the cooler, since if this steam should come in contact with the pigment at sufficiently low temperature, it would condense as moisture on the pigment.

Various forms of apparatus may be employed for practicing the method of this invention, one of which is diagrammatically illustrated in the accompanying drawing, but it is to be expressly understood that such drawing is for the purpose of illustration only and is not designed to define the limits of the invention, reference being had to the appended claims for this purpose.

This drawing is a diagrammatic view of an apparatus for continuously passing pigment first through a muffling furnace and thence onward through a cooler from which it is delivered into a suitable bin.

Referring to the drawing, reference numeral 1 indicates a hopper into which the pigment may be fed in the usual or any suitable manner; 2 indicates a closed conduit within which operates a power-driven screw 2', and the hopper 1 delivers the pigment into the conduit 2 along which it is advanced by the screw 2'. A suitable muffling furnace 3 surrounds a portion of the conduit 2, and thus effects the heating of that portion of the conduit within the furnace and of the pigment during the time it is being advanced through the furnace 3. As here shown, the upper portion of the conduit 2 within the furnace 3 is somewhat enlarged as at 2" and an inlet 8 is provided at one end of said enlargement 2" and an outlet 9 at the other end thereof. At point 5 in the conduit 2, where the pigment enters the furnace 3, and at point 6 in said conduit, where the pigment leaves the furnace 3, the screw 2' has the flights thereof omitted, and by the operation of the apparatus the pigment packs within the furnace at the points 5 and 6 leaving a space 11 between said points and within the furnace through which the pigment is advanced by the screw, but without entirely filling the space. Immediately beyond the point 6 in the conduit 2, the said conduit is surrounded by a suitable water jacket 14 for quickly cooling the pigment as it passes through said jacket. Water is admitted into the chamber 11 through the inlet 8, and by reason of the temperature within said chamber (400° C.–900° C. depending on individual considerations) this water is immediately converted into gas at high pressure, which gas comes in contact with the pigment as it passes through the chamber 11 and then leaves said chamber through the outlet 9. Other suitable inert gas or gases, such as CO₂, that is reactive with carbon, or non-oxidizing flue gas may be used in place of the water in gaseous form. The water vapor in the chamber 11, due to a slight pressure, tends to pass out of said chamber at the entrance end of the furnace and the exit end thereof. Such exit of the gas at either one of these points into the cooler parts of the conduit 2 would result in a condensation of moisture on the pigment within the conduit 2. The packed masses of pigment at the points 5 and 6 constitute seals within the furnace to prevent this exit of the vapor from the chamber 11 at these points. In some cases it is desirable to reenforce the pigment seals by introducing inert gas under pressure into the conduit 2, to the rear of the pigment seal 5 and in advance of the pigment seal 6, through suitable inlets 10 and 12. The pressure of this inert gas is so adjusted as to effectively prevent the exit of the water vapor from the furnace 3 and its consequent condensation in the form of moisture on the pigment on the exterior of the furnace.

If desired, volatile materials or substances that will react to produce volatile materials may be added at 10 or at the hopper 1 to reenforce the seal at 5.

The flights may be removed from the screw 2' at the point 7 just beyond the cooler 14, thus forming a pigment seal at this point for the inert gas that enters the conduit 2 at 12. The packing of the pigment in the hopper 1 enables the pressure of the gas entering at point 10 to be maintained at that point. After the pigment passes the cooler 14 and the seal at point 7, it is discharged into a suitable container 4 from which it may be removed either periodically or continuously from the bottom.

In some cases where it is desired to eliminate zinc oxide from the zinc sulphide pigment sulphur is added and when the pigment enters the heating zone at 5, one of the reactions that takes place is

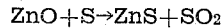

The SO₂ formed helps to maintain the seal at the point 5. Inert gas that may be introduced at point 10, if found necessary, enables the pressure to be maintained at the rear of seal point 5 equal to or slightly superior to the pressure in 11, and thus prevents the water vapor from passing from 11 to the rear of seal 5 and being condensed upon the pigment, and thus the vapor or other inert gas in the chamber 11 is forced to leave at the exit point 9, together with the excess sulphur vapor, SO₂, and absorbed gases. If carbon is present and the temperature is high enough, or if catalytic agents are present at lower temperatures, the carbon will burn to CO or CO₂.

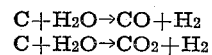

The water jacket 14 makes it possible to rapidly cool the pigment. If the sole purpose of the heating is to refine the pigment by removing the free sulphur and absorbed gases therefrom, a relatively low temperature and short time before cooling is sufficient, but if it is to be desired to increase the size of the particles and perhaps to remove carbon, a higher temperature and a longer time may prove desirable.

It will be readily appreciated that the apparatus shown can be operated at a relatively low temperature and the pigment exposed thereto for a short period of time required when it is merely desired to refine the pigment by the removal of impurities; or, if it is desired to increase the size of or "grow" the particles (and perhaps remove carbon) a higher temperature may be employed and the pigment remain under treatment for a longer period of time, as may be desired.

It will also be understood that the apparatus and the method of the invention may be employed in the treatment of such pigments as lithopone, zinc sulphide and zinc oxide made in a wet way and dried and disintegrated before introduction into the hopper. In the case of the wet type ZnS pigments it is often desirable to add some free sulphur or other volatile matter such as ammonium carbonate, and with either the wet or the dry type of ZnS pigments volatile organic liquids may be sometimes advantageously added. Moreover, the bin 4 may be omitted and the pigment discharged directly into the air at a temperature of about 100° C. and below a temperature at which the ZnS containing pigment would oxidize, which for safety should be well below 400° C.–450° C. A temperature of 110° C. has been found to give satisfactory results.

Zinc oxide made by the American process contains SO₃ either as a gas on the surface of the zinc oxide particles or combined with them as ZnSO₄. For some purposes this acidic material (SO₃ or ZnSO₄) is undesirable or too great in amount, and one of the objects of the present invention is to eliminate all or part of it. It has heretofore been proposed to add carbonaceous material to the zinc oxide and heat and stir the mixture in a muffle. The high temperature and carbonaceous material reduces the ZnSO₄ to ZnSO₃, and this breaks down readily to ZnO and SO₂, which latter is readily driven off with a current of gas, after which air is admitted to burn out the excess carbon. In actual commercial practice considerable quantities of sulphur are driven off and the particle size of the pigment materially increases.

By the present invention the acidic material above referred to (SO₃ or ZnSO₄) may be eliminated wholly or in part without greatly increasing the size of the particles. For example, when zinc oxide is heated in the presence of water vapor, the particles grow less and more sulphur is driven off. Apparently, an absorbed film of water on each oxide particle prevents the growth. By treating the zinc oxide in an apparatus of the character illustrated, it becomes possible to add hydrogen or other reducing gas during the muffling. It is probably impractical to remove all of the sulphur by heating the zinc oxide, even in the presence of a reducing gas that would reduce the ZnSO₄ to ZnSO₃ to eliminate the sulphur as a gas. It has been recognized in the art that zinc sulphate will react with zinc oxide and moisture to form an insoluble inert material that will not harm zinc oxide for the purposes where sulphur is undesirable. When the muffling is carried out in an atmosphere of steam and the temperature of the zinc oxide as it discharges from the apparatus is sufficiently low, this reaction will take place and much of the sulphur that has not been driven out at the high temperature will be changed over to the basic insoluble compound referred to.

Referring to the drawing, zinc oxide mixed with a suitable carbonaceous material is passed from the hopper 1 into the furnace 3, and water vapor with hydrogen gas, or other reducing gas, is introduced at 8 and brought into contact with the mixture of zinc oxide and carbonaceous material in the chamber 11, and passes out at the exit 9. The water vapor or other gas is sealed within the chamber 11, but for the exit 9, by the pigment seals 5 and 6 on the opposite sides of said chamber, reenforced when found desirable by inert gas pressure introduced to the rear of the pigment seal 5 at 10, and forward of the pigment seal 6 at 12. After passing the cooler 14, the refined zinc oxide is deposited in the bin 4. In this case the size of the zinc oxide particles will not be greatly increased.

It has heretofore been regarded as necessary in the treatment of zinc sulphide or zinc oxide containing free carbon to heat the same to a temperature of 800° C. to 900° C. before the chemical action of the water will burn out the carbon. I have discovered, however, that if a small amount of a sodium compound, such as NaCl (common table salt) or NaHCO₃ (ordinary baking soda) be added to the zinc sulphide or zinc oxide pigment containing free carbon, the carbon may be readily burned out at a temperature of approximately 500° C. Accordingly, when treating zinc sulphide or zinc oxide containing free carbon, the sodium compound is added to the pigment before it is introduced into the apparatus, and the mixture is then passed through the apparatus in the manner heretofore described.

It will be understood that when zinc oxide is passed through the chamber 11 in an atmosphere of water vapor, the temperature may be sufficiently low to permit some of the water vapor to condense on the pigment as it leaves the refiner and thus react with the residual $ZnSO_4$ and the zinc oxide to change the zinc sulphate to the insoluble basic material heretofore referred to.

Having thus described the invention, what is claimed is:

1. The method of treating zinc sulphide pigment, which consists in adding volatile material thereto, then passing the pigment into a furnace, subjecting the same while within the furnace to the action of a current of inert gas, and compacting the pigment into a seal within the furnace at the point where it enters the furnace, whereby the volatilization of said volatile material creates a gas pressure within the seal that assists in the sealing effect.

2. The process which consists in passing a zinc sulphide-containing pigment continuously through a heated chamber, whereby said pigment is heated, subjecting said heated pigment to the action of a current of steam while in said chamber, and preventing steam from leaving said chamber at the points where the pigment enters and leaves said chamber by means of pigment seals heated above the condensation temperature of the steam at said points.

3. The process which consists in passing a zinc-sulphide containing pigment continuously through a heated chamber, whereby said pigment is heated, subjecting said heated pigment to the action of a current of steam while in said chamber, and preventing steam from leaving said chamber at the points where the pigment enters and leaves said chamber by means of pigment seals heated above the condensation temperature of the steam reenforced by inert gas pressure at said points.

4. The method of treating a mixture of zinc sulphide and zinc oxide pigments which consists in adding sulphur thereto, passing the mixture continuously through a furnace heated above 400° C., compacting the pigment into a seal within the furnace at the point where it enters the furnace, and subjecting the pigment to the action of water vapor while in the furnace, the resulting reaction gas $SO_2$ in said seal assisting in sealing the water vapor within the furnace.

5. The process which consists in passing a zinc sulphide-free-carbon containing pigment through a chamber heated to approximately 500° C., subjecting said heated pigment to the action of steam while in said chamber, and preventing the steam from leaving said chamber at the points where the pigment enters and leaves said chamber by means of pigment seals heated above the condensation temperature of the steam at said points, and then dry cooling the pigment.

6. The process which consists in passing zinc pigment containing free carbon through a chamber heated to approximately 500° C., subjecting said heated pigment to the action of steam while in said chamber, and preventing the steam from leaving said chamber at the points where the pigment enters and leaves said chamber by means of pigment seals heated above the condensation temperature of the steam at said points, and then dry cooling the pigment.

7. The process which consists in passing a column of zinc sulphide-containing pigment through a heated chamber and thence to a cooler, maintaining pigment seals in said column upon each side of said chamber, heating said seals above the condensation temperature of steam, reenforcing said seals by inert gas pressure, and introducing steam into said chamber between said seals.

HARLAN A. DEPEW.